(12) United States Patent
Kumazaki et al.

(10) Patent No.: US 9,130,338 B2
(45) Date of Patent: Sep. 8, 2015

(54) EXCIMER LASER AND LASER DEVICE

(71) Applicant: Gigaphoton Inc., Tochigi (JP)

(72) Inventors: Takahito Kumazaki, Tochigi (JP);
Takashi Matsunaga, Tochigi (JP);
Kazuya Takezawa, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 13/738,028

(22) Filed: Jan. 10, 2013

(65) Prior Publication Data

US 2013/0208744 A1    Aug. 15, 2013

(30) Foreign Application Priority Data

Feb. 15, 2012   (JP) ................. 2012-030373

(51) Int. Cl.
| | |
|---|---|
| *H01S 3/22* | (2006.01) |
| *H01S 3/04* | (2006.01) |
| *G02B 7/00* | (2006.01) |
| *H01S 3/08* | (2006.01) |
| *H01S 3/106* | (2006.01) |
| *H01S 3/225* | (2006.01) |
| *H01S 3/23* | (2006.01) |

(52) U.S. Cl.
CPC . *H01S 3/04* (2013.01); *G02B 7/008* (2013.01); *H01S 3/0401* (2013.01); *H01S 3/08036* (2013.01); *H01S 3/08004* (2013.01); *H01S 3/08009* (2013.01); *H01S 3/106* (2013.01); *H01S 3/225* (2013.01); *H01S 3/2333* (2013.01)

(58) Field of Classification Search
CPC ..... H01S 3/08036; H01S 3/04; H01S 3/0401; H01S 3/08004; H01S 3/08009; H01S 3/225; H01S 3/2333; H01S 3/106
USPC .......................... 372/34, 36, 57, 65, 100, 102
See application file for complete search history.

(56) References Cited

U.S. PATENT DOCUMENTS

| | | | | |
|---|---|---|---|---|
| 5,737,346 | A  * | 4/1998 | Stenstrom | 372/21 |
| 7,088,758 | B2 | 8/2006 | Sandstrom et al. | |
| 7,154,928 | B2 | 12/2006 | Sandstrom et al. | |
| 2002/0012374 | A1 * | 1/2002 | Basting et al. | 372/55 |
| 2003/0103280 | A1 * | 6/2003 | Wakabayashi et al. | 359/837 |
| 2007/0091968 | A1 * | 4/2007 | Wakabayashi et al. | 372/55 |
| 2007/0133644 | A1 * | 6/2007 | Gokay et al. | 372/70 |

FOREIGN PATENT DOCUMENTS

JP    2006024766 A  *  1/2006 ............ H01S 3/1055

* cited by examiner

*Primary Examiner* — Yuanda Zhang
(74) *Attorney, Agent, or Firm* — Kratz, Quintos & Hanson, LLP

(57) ABSTRACT

An excimer laser may include a frame, a base plate on which the frame is disposed, an excimer laser configured to oscillate and output laser light by discharge-pumping within a chamber containing a laser gas, an optical element that is mounted upon the frame and that is disposed in the optical path of the outputted laser light and a heat removal mechanism connected to both the frame and the base plate.

12 Claims, 12 Drawing Sheets

EXCIMER LASER AND LASER DEVICE

CROSS-REFERENCE TO RELATED APPLICATION

The present application claims priority from Japanese Patent Application No. 2012-030373, filed Feb. 15, 2012, the entire contents of which are hereby incorporated by reference.

BACKGROUND

1. Technical Field

The present disclosure relates to excimer lasers and laser devices.

2. Related Art

The miniaturization and increased levels of integration of semiconductor integrated circuits has led to a demand for increases in the resolutions of semiconductor exposure devices (called "exposure devices" hereinafter). Accordingly, advances are being made in the reduction of the wavelengths of light emitted from exposure light sources. Gas laser devices are being used as exposure light sources instead of conventional mercury lamps. At present, a KrF excimer laser device that emits ultraviolet light at a wavelength of 248 nm and an ArF excimer laser device that emits ultraviolet light at a wavelength of 193 nm are being used as gas laser devices for exposure.

Immersion exposure, in which the apparent wavelength of an exposure light source is reduced by filling the space between the exposure lens of an exposure device and a wafer with a liquid and changing the refractive index, is being researched as a next-generation exposure technique. In the case where immersion exposure is carried out using an ArF excimer laser device as the exposure light source, the wafer is irradiated with ultraviolet light at a wavelength of 134 nm within the liquid. This technique is referred to as ArF immersion exposure (or ArF immersion lithography).

The natural oscillation amplitude of a KrF or ArF excimer laser device is as wide as 350-400 pm, and thus chromatic aberration will occur if the projection lens in the device is used, leading to a drop in the resolution. It is therefore necessary to narrow the spectral bandwidth (spectral width) of the laser beam emitted from the gas laser device until the chromatic aberration reaches a level that can be ignored. Accordingly, the spectral width has been narrowed by providing a line narrow module (LNM) having a line narrowing element (an etalon, a grating, or the like) within the laser resonator of the gas laser device. A laser device that narrows the spectral width in this manner is called a narrow-band laser device.

SUMMARY

An excimer laser according to an aspect of the present disclosure may include: a frame; a base plate on which the frame is disposed; an excimer laser configured to oscillate and output laser light by discharge-pumping within a chamber containing a laser gas; an optical element that is mounted upon the frame and that is disposed in the optical path of the outputted laser light; and a heat removal mechanism connected to both the frame and the base plate.

BRIEF DESCRIPTION OF THE DRAWINGS

Exemplary embodiments of the present disclosure will be described hereinafter with reference to the appended drawings.

DETAILED DESCRIPTION

Figure 1:
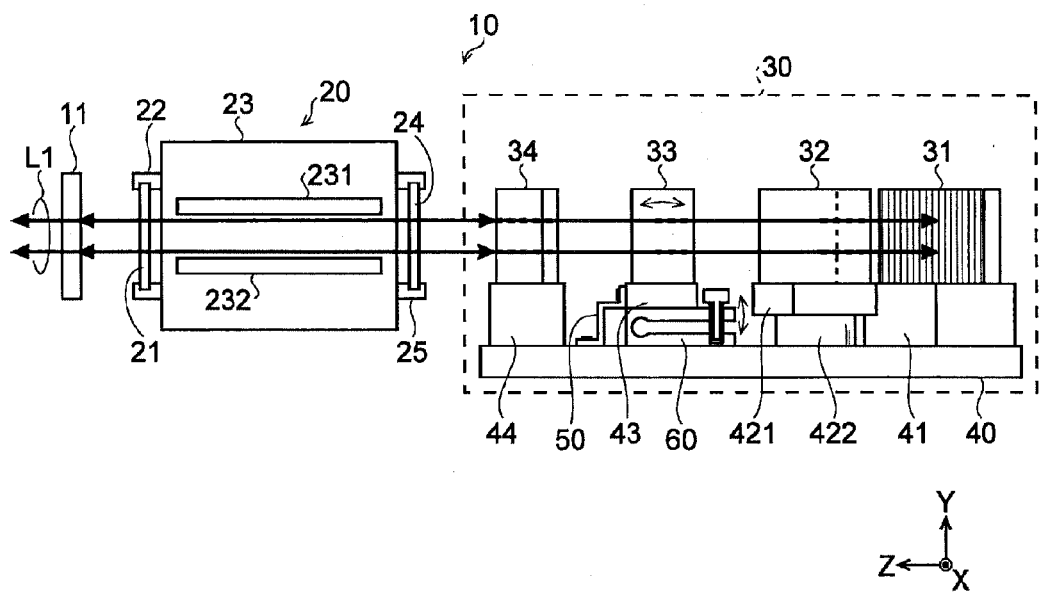
FIG. 1 is a side view schematically illustrating the configuration of a master oscillator system according to an embodiment of the present disclosure.

Embodiments of the present disclosure will be described in detail hereinafter with reference to the drawings. The embodiments described hereinafter indicate examples of the present disclosure, and are not intended to limit the content of the present disclosure. Furthermore, not all of the configurations and operations described in the embodiments are required configurations and operations in the present disclosure. Note that identical constituent elements will be given identical reference numerals, and redundant descriptions thereof will be omitted. The following descriptions will be given according to the order of contents indicated below.

Contents

1. Outline
2. Explanation of Terms
3. Narrow-Band Laser Device (Master Oscillator System)
   3.1 Configuration 3.1.1 Heat Removal Mechanism
  3.1.1.1 First Example
  3.1.1.2 Second Example
  3.1.1.3 Third Example
3.1.2 Attitude Adjustment Mechanism
  3.1.2.1 First Example
  3.1.2.2 Second Example
3.1.3 Specific Example
3.2 Effects
3.3 Variations
3.3.1 Grating Unit
3.3.2 Mirror Unit
4. Variable Spectral Bandwidth Laser Device for Exposure Device
  4.1 Configuration
  4.2 Operations
5. Other
  5.1 Amplifying Apparatus
  5.1.1 Embodiment Including Fabry-Perot Resonator
  5.1.2 Embodiment Including Ring Resonator
1. Outline The embodiments illustrated hereinafter as examples can control the attitude of an optical element disposed within an optical resonator of a master oscillator. Through this, stable laser oscillation can be realized.

2. Explanation of Terms

Next, terms used in the present disclosure will be defined.

In the optical path of laser light, the side toward the source of the laser light will be referred to as "upstream", whereas the side toward the target destination of the laser light will be referred to as "downstream".

In addition, "optical axis" may be an axis that follows the direction of travel of the laser light and passes through approximately the center of a cross-section of the laser light beam.

"Beam expansion" refers to the cross-section of a beam gradually widening.

A "reduced beam" may be laser light whose laser cross-section is gradually reduced as the laser light travels. An "expanded beam" may be laser light whose laser cross-section is gradually enlarged as the laser light travels.

A "predetermined repetition rate" may be any rate that has an approximately predetermined repetition rate, and need not necessarily be a constant repetition rate.

An "excimer laser gas" may be a mixed gas that serves as an excimer laser medium during pumping, and may include, for example, one of Kr gas and Ar gas, as well as $F_2$ gas and Ne gas, and may further include Xe gas as necessary.

"Prism" refers to an element, having a triangular column shape or a shape similar thereto, through which light including laser light can pass. It is assumed that the base surface and the top surface of the prism are triangular or a shape similar thereto. The three surfaces of the prism that intersect with the base surface and the top surface at approximately 90° are referred to as side surfaces. In the case of a right-angle prism, the surface that does not intersect with the other two of the side surfaces at 90° is referred to as a sloped surface. Note that a prism whose shape has been changed by shaving the apex of the prism or the like can also be included as a prism in the present descriptions.

In the present disclosure, the direction in which laser light travels is defined as a Z direction. Likewise, a direction that is perpendicular to the Z direction is defined as an X direction, and a direction that is perpendicular to both the X direction and the Z direction is defined as a Y direction. Although the direction in which laser light travels is the Z direction, there are cases, in the descriptions, where the X direction and the Y direction change depending on the position of the laser light being discussed. For example, in the case where the direction in which laser light travels (the Z direction) has changed within the X-Z plane, the orientation of the X direction changes after the change in the direction of travel in accordance with that change in the direction of travel, but the Y direction does not change. On the other hand, in the case where the direction in which laser light travels (the Z direction) has changed within the Y-Z plane, the orientation of the Y direction changes after the change in the direction of travel in accordance with that change in the direction of travel, but the X direction does not change. Note that in order to facilitate understanding, in the drawings, coordinate systems are shown as appropriate for laser light that enters into the optical element located furthest upstream among the illustrated optical elements and for laser light emitted from the optical element located furthest downstream among the illustrated optical elements. Coordinate systems for laser light that enters into other optical elements are also illustrated as necessary.

3. Narrow-Band Laser Device (Master Oscillator System)

First, an overview of a narrow-band laser device (called a "master oscillator system" hereinafter) according to an embodiment of the present disclosure will be described in detail hereinafter with reference to the drawings.

3.1 Configuration

Figure 2:
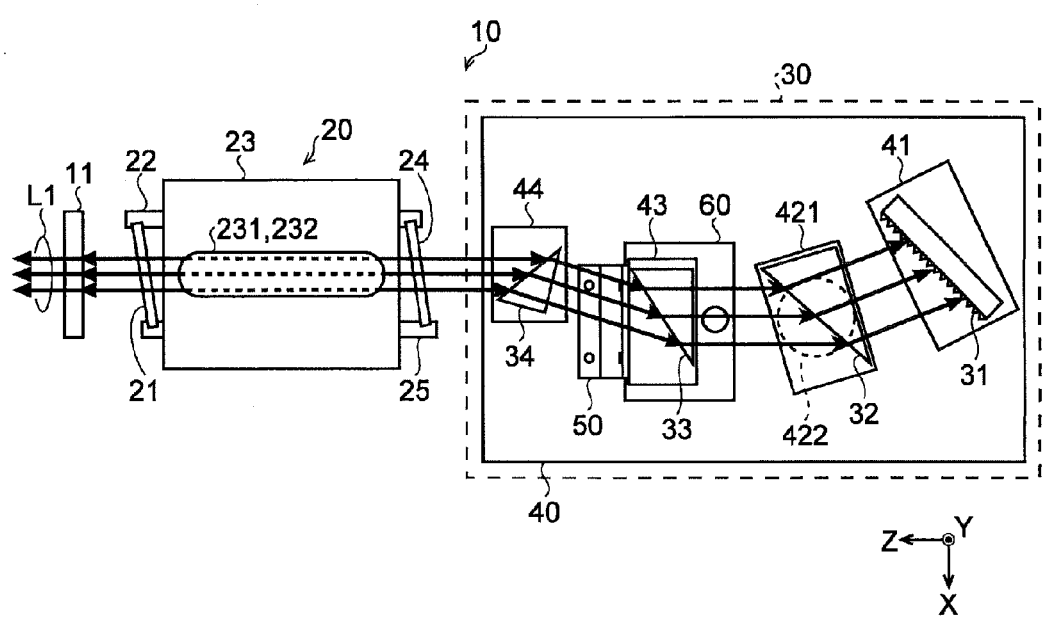
FIG. 2 is a top view schematically illustrating the configuration of the master oscillator system shown in FIG. 1.

FIG. 1 is a side view schematically illustrating the configuration of a master oscillator system 10. FIG. 2 is a top view schematically illustrating the configuration of the master oscillator system 10.

As shown in FIGS. 1 and 2, the master oscillator system 10 may include an output coupling mirror 11, an amplifying unit 20, and a line narrow module 30.

The line narrow module 30 may include a grating 31. The grating 31 and the output coupling mirror 11 may form an optical resonator. The grating 31 may function as a wavelength selection unit that restricts the wavelength of laser light L1 that travels back and forth within the optical resonator. The amplifying unit 20 may amplify the laser light L1 that travels back and forth within the optical resonator.

The amplifying unit 20 may include a laser chamber 23, windows 21 and 24, and a pair of discharge electrodes 231 and 232. The windows 21 and 24 may be held by window holders 22 and 25, respectively, provided in the laser chamber 23. Here, the windows 21 and 24 may be tilted relative to the optical path of the laser light L1 by an extremely small amount. That angle of slope may be, for example, a Brewster's angle. The interior of the laser chamber 23 may be filled with an excimer laser gas serving as a laser medium. A pumping voltage may be supplied from a power source (not shown) between the discharge electrodes 231 and 232 under the control of a controller.

The master oscillator system 10 may further include a wavefront tuning unit (not shown) that tunes the wavefront of the laser light L1 that travels back and forth within the optical resonator. This wavefront tuning unit may be disposed, for example, in the optical path between the output coupling mirror 11 and the laser chamber 23, in the optical path between the laser chamber 23 and the line narrow module 30, or the like. The wavefront tuning unit may, for example, be configured using a concave cylindrical lens and a convex cylindrical lens disposed so that their curved surfaces face each other. It is preferable for at least one of the convex cylindrical lens and the concave cylindrical lens to be capable of moving along the optical path of the laser light L1 within the optical resonator. According to this configuration, the wavefront of the laser light L1 can be controlled by changing the distance between the convex cylindrical lens and the concave cylindrical lens.

One or more prisms 32-34 included in the line narrow module 30 may function as a wavelength tuning unit that tunes the wavelength of the laser light L1 present in the optical resonator configured by the grating 31 and the output coupling mirror 11. In this case, for example, the prism 32 disposed immediately in front of the grating 31 may be anchored to a rotating table 422 that is capable of rotating. The rotation surface of the prism 32 may, for example, be a surface that is parallel to a light entry surface of the prism 32 into which the laser light L1 enters. According to this configuration, the angle at which the laser light L1 enters into the grating 31 through the prism 32 can be adjusted by adjusting the rotation amount and the rotation direction of the rotating table 422. As a result, the wavelength of the laser light L1 present within the optical resonator can be adjusted.

Meanwhile, the line narrow module 30 may be capable of adjusting the size of the beam cross-section of the laser light L1 that enters into the grating 31. In this case, the line narrow module 30 may include a mechanism (not shown) for combining at least one of the one or more prisms 32-34 with another prism having a different magnification rate, without altering the optical path and divergence of the laser light L1. According to such a configuration, the size of the beam cross-section of the laser light L1 that enters into the grating 31 can be changed. As a result, the spectral width of the wavelength of the laser light L1 present within the optical resonator can be greatly changed.

In addition, at least one of the grating 31 and the prisms 32, 33, and 34 may be mounted upon an attitude adjustment mechanism 60 that is capable of adjusting the tilt (also called the "attitude" hereinafter) relative to the direction in which the laser light L1 advances (this may be the optical path or optical axis). Here, the example given illustrates a case where the prism 33 is mounted upon the attitude adjustment mechanism 60. Furthermore, the attitude adjustment mechanism 60 may be capable of rotating the prism 33 with the direction parallel to the X axis serving as the rotational center. According to this configuration, the direction in which the laser light L1 that travels back and forth within the optical resonator advances can be adjusted in the ±Y direction. The specific configuration of the attitude adjustment mechanism 60 will be described on later.

The grating 31 and the prisms 32, 33, and 34 within the line narrow module 30 may, for example, be anchored to frames 41, 421, 43, and 44, respectively. In the case where, for example, the prism 32 can be rotated, the prism 32 may be mounted along with the frame 421 upon the rotating table 422. Meanwhile, in the case where the attitude of the prism 33 can be controlled, the prism 33 may be mounted along with the frame 43 upon the attitude adjustment mechanism 60.

The frame 41 of the grating 31, the rotating table 422 that bears the frame 421 of the prism 32, the attitude adjustment mechanism 60 that bears the frame 43 of the prism 33, and the frame 44 of the prism 34 may be anchored to a base plate 40 at predetermined locations of the base plate 40. Here, for example, the frame 43 mounted upon the attitude adjustment mechanism 60 may be connected to the base plate 40 via a heat removal mechanism 50. Through this, heat from the prism 33 upon the frame 43 can be efficiently removed via the frame 43 and the heat removal mechanism 50. However, this does not remove waste heat from the prism 33 to the base plate 40 via the attitude adjustment mechanism 60. In addition, the other frames 41, 421, and 44 may also be connected to the base plate 40 via heat removal mechanisms (not shown) that are the same as the heat removal mechanism 50. The specific configuration of the heat removal mechanism 50 will be described later.

3.1.1 Heat Removal Mechanism

Here, the heat removal mechanism 50 will be described using several examples.

3.1.1.1 First Example

Figure 3:
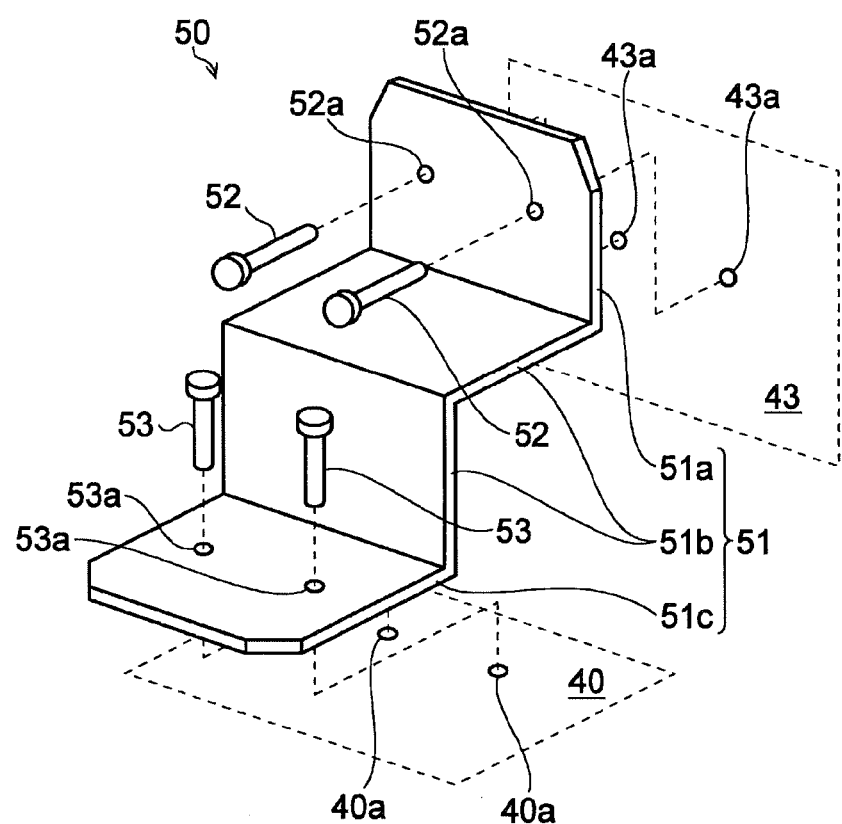
FIG. 3 schematically illustrates an example of the configuration of a heat removal mechanism according to a first example of an embodiment.

FIG. 3 schematically illustrates an example of the configuration of the heat removal mechanism 50 according to a first example. As shown in FIG. 3, the heat removal mechanism 50 may include a heat removal plate 51 and bolts 52 and 53. The heat removal plate 51 may include a first section (an attachment section) 51a, a second section (a heat transfer section) 51b, and a third section (an attachment section) 51c. The first section 51a may be located on one end of the second section 51b. The third section 51c may be located on the other end of the second section 51b. This heat removal plate 51 may be processed so that a single plate member includes the sections from the first section 51a to the third section 51c.

The first section 51a may be attached to the frame 43 using one of more of the bolts 52. Accordingly, it is preferable for one or more holes 52a to be provided in the first section 51a for inserting the bolts 52. On the other hand, it is preferable for one or more screw holes 43a, into which the threaded sections of the bolts 52 are screwed, to be provided in the frame 43.

Likewise, the third section 51c may be attached to the base plate 40 using one or more of the bolts 53. Accordingly, it is preferable for one or more holes 53a to be provided in the third section 51c for inserting the bolts 53. On the other hand, it is preferable for one or more screw holes 40a, into which the threaded sections of the bolts 53 are screwed, to be provided in the base plate 40.

It is preferable for at least the second section 51b in the heat removal plate 51 to be capable of deforming comparatively easily under external force in at least a specific direction. This may be a characteristic resulting from the shape of the second section 51b or a characteristic resulting from the material of the second section 51b. The "specific direction" may be at least a direction in which the attitude of the frame 43 and the prism 33 is controlled by the attitude adjustment mechanism 60. The meaning of "specific direction" may be understood to be the same in the examples in other drawings described hereinafter as well. Here, it is further preferable for the second section 51b to be flexible to an extent that essentially does not interfere with the attitude displacement of the frame 43 and the prism 33 caused by the attitude adjustment mechanism 60.

In the case where a sufficient flexibility is to be realized through the shape of the heat removal plate 51, the second section 51b may, for example, have a shape in which the plate-shaped member is bent in a zigzag shape, as shown in FIG. 3. The bend is not limited to a single location, and may be in a plurality of locations. Here, each bend location may be bent at a right angle, or may be bent at an obtuse angle or an acute angle.

In addition, a metal such as iron (Fe), copper (Cu) aluminum (Al), or the like may be used as the material of the heat removal plate 51. However, the material is not limited thereto, and any material having a comparatively high thermal conductivity can be used. Here, it is further preferable to use a material that, for example, can achieve a sufficient flexibility in the post-processing shape of the heat removal plate 51 for the material of the heat removal plate 51. In addition, a material having a higher thermal conductivity than the material used for the frame 43 may be used for the heat removal plate 51. Furthermore, the surface of the heat removal plate 51 may be plated in order to reduce degradation caused by corrosion. Nickel (Ni) or the like may be used for the plating material.

Meanwhile, at least the second section 51b of the heat removal plate 51 is not limited to a single plate member, and may have a configuration in which a plurality of plate members are stacked together. By doing so, there are cases where the flexibility in at least the specific direction can be increased while also increasing the heat removal effectiveness.

3.1.1.2 Second Example

Figure 4:
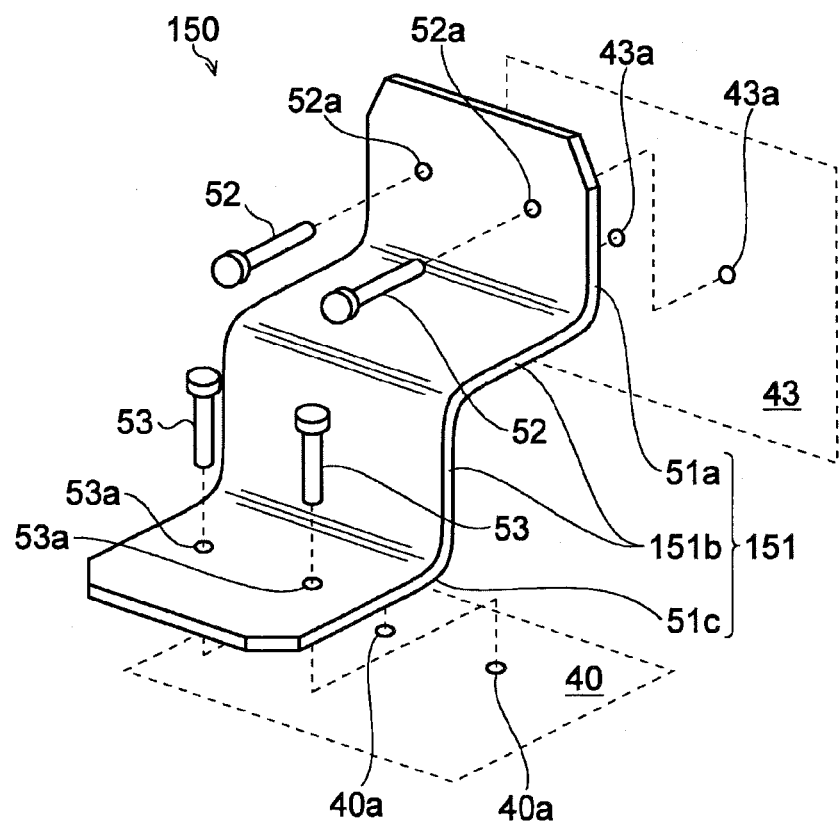
FIG. 4 schematically illustrates an example of the configuration of a heat removal mechanism according to a second example of an embodiment.

FIG. 4 schematically illustrates an example of the configuration of a heat removal mechanism 150 according to a second example. As shown in FIG. 4, each bent area in a second section 151b of the heat removal mechanism 150 may be a curve that progresses in a rounded manner. As with the heat removal mechanism 50 according to the first example, this shape makes it possible to realize the second section 151b that deforms comparatively easily under external force in at least the specific direction and that is capable of efficiently removing heat from the frame 43 to the base plate 40. Note that other configurations, the material, and so on may be the same as those in the heat removal mechanism 50 described using FIG. 3, and thus detailed descriptions thereof will be omitted here.

3.1.1.3 Third Example

Figure 5:
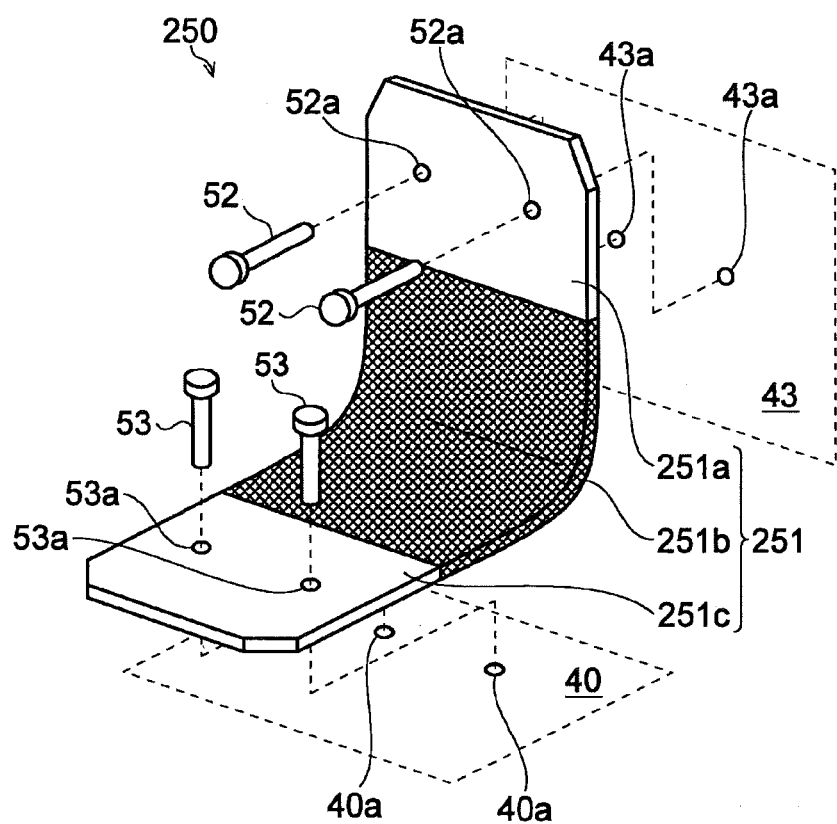
FIG. 5 schematically illustrates an example of the configuration of a heat removal mechanism according to a third example of an embodiment.

Meanwhile, the member used for the heat removal mechanism 50 is not limited to a plate member. For example, a mesh or the like manufactured by weaving together copper wires, carbon fibers, or the like may be used. FIG. 5 schematically illustrates an example of the configuration of a heat removal mechanism 250 according to a third example, in which a copper mesh is employed.

As shown in FIG. 5, the heat removal mechanism 250 may include a heat removal section 251 and bolts 52 and 53. The heat removal section 251 may include a first member 251a, a second member 251b, and a third member 251c.

The second member 251b may be, for example, a mesh or the like manufactured by weaving together copper wires, carbon fibers, or the like. Using such a mesh for the second member 251b makes it possible to ensure flexibility in at least the specific direction through the structure of the second member 251b.

Wires made of a metal such as iron (Fe), copper (Cu), aluminum (Al), carbon fibers, or the like may be used as the material of the second member 251b. However, the wires are not limited thereto, and wires formed from any material having a comparatively high thermal conductivity can be used. Here, it is further preferable to use a material that, for example, can achieve a sufficient flexibility in the post-weave mesh shape for the material of the second member 251b. In addition, a material having a higher thermal conductivity than the material used for the frame 43 may be used for the second member 251b. Furthermore, the surface of the mesh used for the second member 251b may be plated in order to reduce degradation caused by corrosion. Nickel (Ni) or the like may be used for the plating material.

The first member 251a and the third member 251c may be the same as the first section 51a and the third section 51c, respectively, of the heat removal plate 51 shown in FIG. 3. It is preferable for the first member 251a and the second member 251b, and the third member 251c and the second member 251b, to be connected using a material that has a high thermal conductivity, such as solder, so as not to cause a significant drop in the conductivity. However, the example is not limited thereto, and the configuration may be such that a single mesh is used from the first member 251a to the third member 251c. In this case, the holes 52a and 53a into which the bolts 52 or 53 are screwed may be reinforced using grommets or the like.

As with the heat removal mechanism 50 according to the first example, the stated configuration makes it possible to realize the heat removal mechanism 250 that deforms comparatively easily under external force in at least the specific direction and that is capable of efficiently removing heat from the frame 43 to the base plate 40. Note that other configurations, the material, and so on may be the same as those in the heat removal mechanism 50 described using FIG. 3, and thus detailed descriptions thereof will be omitted here.

3.1.2 Attitude Adjustment Mechanism

Next, the attitude adjustment mechanism 60 will be described according to several examples.

3.1.2.1 First Example

Figure 6:
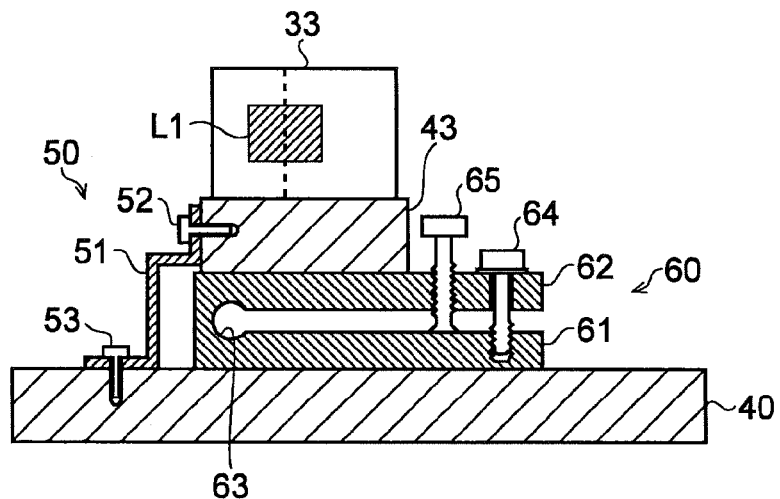
FIG. 6 is a side view schematically illustrating the configuration of an attitude adjustment mechanism according to a first example of an embodiment.
Figure 7:
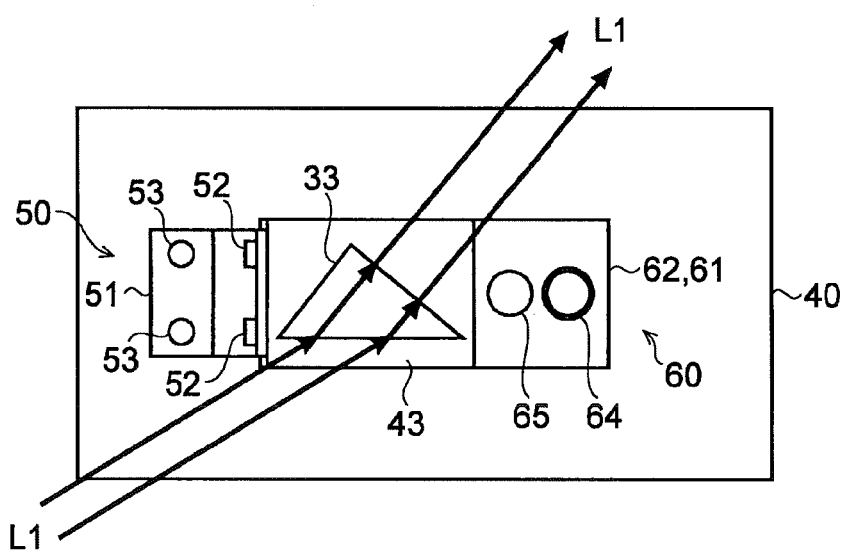
FIG. 7 is a top view illustrating the attitude adjustment mechanism illustrated in FIG. 6.

FIGS. 6 and 7 schematically illustrate the configuration of the attitude adjustment mechanism 60 according to a first example. FIG. 6 is a side view of the attitude adjustment mechanism 60. FIG. 7 is a top view of the attitude adjustment mechanism 60.

As shown in FIGS. 6 and 7, the attitude adjustment mechanism 60 may include an attitude adjustment plate and two types of adjustment screws (adjustment sections) 64 and 65. The attitude adjustment plate may include a lower plate section 61, an upper plate section 62, and a turned section (support section) 63. The attitude adjustment plate may be manufactured by, for example, processing a single flat plate.

The lower plate section 61 may, for example, be anchored to a predetermined location of the base plate 40. The upper plate section 62 may be disposed higher than the lower plate section 61, and may be separated from the lower plate section 61 by a predetermined distance while remaining approximately parallel to the lower plate section 61. It is preferable for this predetermined distance to be greater than or equal to the length by which the tilt of the upper plate section 62 is adjusted in the direction that brings the upper plate section 62 toward the lower plate section 61. The top surface of the upper plate section 62 may be a mounting surface on which the frame 43 is anchored. The turned section 63 may function as a deforming section for opening/closing the lower plate section 61 and the upper plate section 62. The turned section 63 may be thinner than the lower plate section 61 and the upper plate section 62 in order to reduce the rigidity at that section.

The adjustment screw 65 may be a member for adjusting the force in the direction that opens the upper plate section 62 relative to the lower plate section 61. The adjustment screw 65 may, for example, be screwed into a screw hole provided in the upper plate section 62, from the mounting surface side thereof, toward the lower plate section 61. The leading end of the adjustment screw 65 may make contact with the lower plate section 61. Here, the leading end of the adjustment screw 65 may be flared.

On the other hand, the adjustment screw 64 may be a member for adjusting the force in the direction that closes the upper plate section 62 relative to the lower plate section 61. The adjustment screw 64 may, for example, be passed through a hole provided in the upper plate section 62 from the side of the mounting surface for the frame 43, and may be screwed into a screw hole provided in the lower plate section 61. It is preferable for the head portion of the adjustment screw 64 to make contact with the mounting surface of the upper plate section 62 when threads on the leading end side of the adjustment screw 64 are screwed into the screw hole in the lower plate section 61. Note, however, that washers or the like may be interposed between the upper plate section 62 and the adjustment screw 64.

According to the stated configuration, adjusting the amount by which the two adjustment screws 64 and 65 are screwed into their respective screw holes makes it possible to open/close the upper plate section 62 relative to the lower plate section 61 using, for example, the turned section 63 essentially as an axis. As a result, the attitude of the prism 33 mounted upon the frame 43 on the upper plate section 62 can be adjusted relative to the optical path of the laser light L1.

In addition, it is preferable for the heat removal mechanism 50 to be attached to the frame 43 and the base plate 40 so that the principal plane of the heat removal plate 51 is essentially parallel to the direction in which the turned section 63 extends (that is, the axis on which the upper plate section 62 pivots). The "principal plane" refers to the plane in FIG. 3 and the like in which the holes 52a and so on are provided in the heat removal mechanism 50. The same applies in the following drawings as well. Here, it is preferable for the direction in which the bent area of the heat removal plate 51 extends to be essentially parallel to the direction in which the turned section 63 extends (that is, the axis on which the upper plate section 62 pivots). According to this configuration, the heat removal plate 51, 151, or the heat removal section 251 can deform with ease in response to the opening/closing of the upper plate section 62. As a result, it is possible to reduce a resistive force that interferes with the control of the attitude of the prism 33. This may be the same in the case where another heat removal mechanism (for example, the heat removal mechanism 150 or 250) is used as well.

3.1.2.2 Second Example

Figure 8:
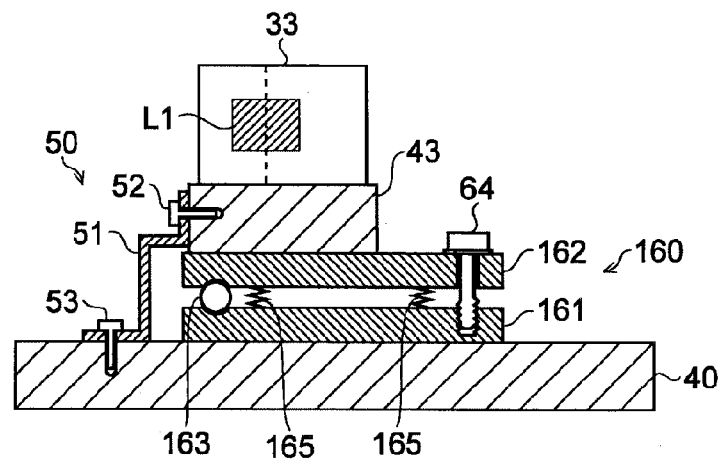
FIG. 8 is a side view schematically illustrating the configuration of an attitude adjustment mechanism according to a second example of an embodiment.
Figure 9:
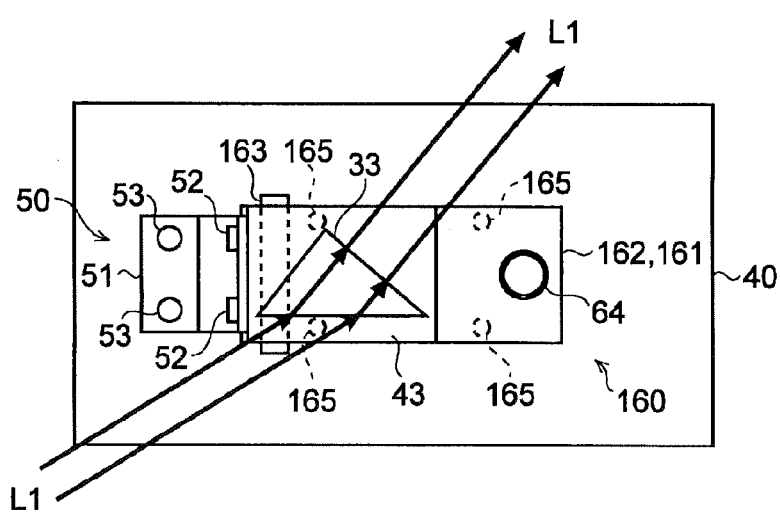
FIG. 9 is a top view illustrating the attitude adjustment mechanism illustrated in FIG. 8.

FIGS. 8 and 9 schematically illustrate the configuration of an attitude adjustment mechanism 160 according to a second example. FIG. 8 is a side view of the attitude adjustment mechanism 160. FIG. 9 is a top view of the attitude adjustment mechanism 160.

As shown in FIGS. 8 and 9, the attitude adjustment mechanism 160 may include a lower plate 161, an upper plate 162, a shaft member (support section) 163, springs 165, and the adjustment screw 64. The adjustment screw 64 may be the same as the adjustment screw 64 in the aforementioned attitude adjustment mechanism 60.

The lower plate 161 and the upper plate 162 may correspond to the respective lower plate section 61 and upper plate section 62 in the attitude adjustment mechanism 60. Accordingly, the upper plate 162 may be disposed higher than the lower plate 161, and may be separated from the lower plate 161 by a predetermined distance while remaining approximately parallel to the lower plate 161.

The shaft member 163 may be used in place of the turned section 63 of the attitude adjustment mechanism 60. The shaft member 163 may, for example, be a cylindrical bar-shaped member. In this case, it is preferable to provide a groove for accepting the shaft member 163 in the lower plate 161 and the upper plate 162, respectively.

The springs 165 may be used in place of the adjustment screw 65 of the attitude adjustment mechanism 60. Accordingly, the springs 165 may be members that are compressed in a manner that applies a force in the direction that opens the upper plate 162 relative to the lower plate 161 and that are attached to the lower plate 161 and the upper plate 162.

According to the configuration described thus far, the tilt of the upper plate 162 can be adjusted relative to the lower plate 161 by adjusting the amount by which the adjustment screw 64 is screwed into the screw hole. As a result, the attitude of the prism 33 relative to the optical path of the laser light L1 can be adjusted. Note that other configurations may be the same as those in the aforementioned attitude adjustment mechanism 60, and thus detailed descriptions thereof will be omitted here.

In addition, it is preferable for the heat removal mechanism 50 to be attached to the frame 43 and the base plate 40 so that the principal plane of the heat removal plate 51 is essentially parallel to the direction in which the shaft member 163 extends (that is, the axis on which the upper plate 162 pivots). Here, it is preferable for the direction in which the bent area of the heat removal plate 51 extends to be essentially parallel to the direction in which the shaft member 163 extends (that is, the axis on which the upper plate 162 pivots). According to this configuration, the heat removal plate 51 can deform with ease in response to the opening/closing of the upper plate 162. As a result, it is possible to reduce a resistive force that interferes with the control of the attitude of the prism 33. This may be the same in the case where another heat removal mechanism (for example, the heat removal mechanism 150 or 250) is used as well.

3.1.3 Specific Example

Figure 10:
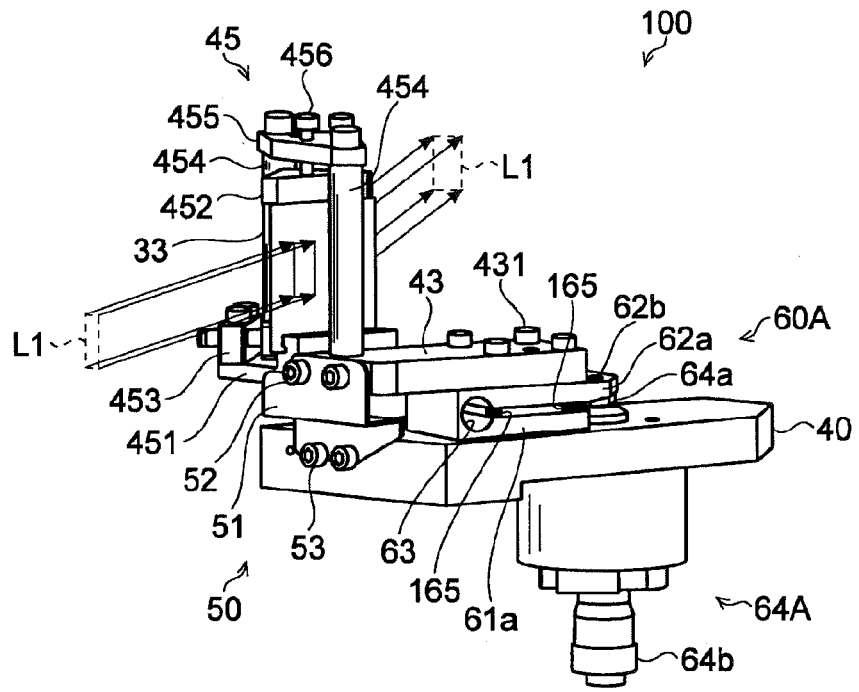
FIG. 10 schematically illustrates the configuration of a prism unit according to a specific example of an embodiment.
Figure 11:
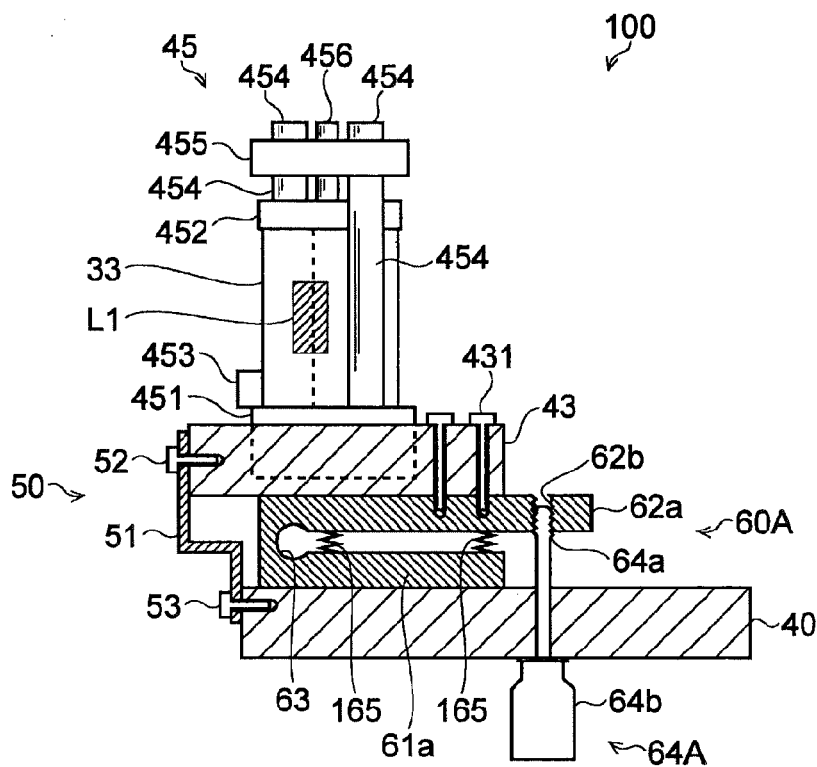
FIG. 11 schematically illustrates the cross-sectional structure of the prism unit illustrated in FIG. 10.

Next, a specific example of a prism unit that includes the aforementioned attitude adjustment mechanism and heat removal mechanism will be described in detail using the drawings. FIG. 10 schematically illustrates the configuration of a prism unit 100 according to the present specific example. FIG. 11 schematically illustrates the cross-sectional structure of the prism unit 100 illustrated in FIG. 10.

As shown in FIGS. 10 and 11, the prism unit 100 may include an attitude adjustment mechanism 60A, the frame 43, a holder 45, and the prism 33.

The attitude adjustment mechanism 60A may be anchored to a predetermined location of the base plate 40. The attitude adjustment mechanism 60A may include: an attitude adjustment plate having a lower plate section 61a, an upper plate section 62a, and the turned section 63; an adjustment screw 64A; and the springs 165. The lower plate section 61a, the upper plate section 62a, and the turned section 63 may be the same as the lower plate section 61, the upper plate section 62, and the turned section 63, respectively. However, the lower plate section 61a may be shortened to an extent that the adjustment screw 64A is not inserted thereinto. The adjustment screw 64A may be a member for adjusting the force in the direction that closes the upper plate section 62a relative to the lower plate section 61a. The adjustment screw 64A may be inserted into a through-hole in the base plate 40 from the lower surface side of the base plate 40, and a leading end 64a thereof may be screwed into a screw hole 62b provided in the upper plate section 62a. A knob 64b on the adjustment screw 64A may protrude toward the lower surface side of the base plate 40. The springs 165 may be members that are compressed in a manner that applies a force in the direction that opens the upper plate section 62a relative to the lower plate section 61a and that are attached to the lower plate section 61a and the upper plate section 62a.

The frame 43 may, for example, be anchored upon the upper plate section 62a of the attitude adjustment mechanism 60A using bolts 431 or the like. The holder 45 for holding the prism 33 may be provided on the frame 43. The holder 45 may include a lower retaining section 451, an upper retaining section 452, a side retaining section 453, support columns 454, a top plate 455, and a biasing pin 456.

Of the holder 45, the lower retaining section 451 may be integral with the frame 43 or may be a separate member. In the case where the lower retaining section 451 is a separate member, the lower retaining section 451 may be anchored to the frame 43 using a bolt or the like (not shown), or may be welded to the frame 43.

The lower retaining section 451 may support the prism 33 from below. As opposed to this, the upper retaining section 452 may hold down the prism 33 from above. Through this configuration, the prism 33 can be supported from above and below. Note that the bases of the plurality of support columns 454 may be anchored to the lower retaining section 451. The top plate 455 may be anchored to the top sections of the support columns 454. A through-hole through which is inserted the biasing pin 456 that protrudes from the upper retaining section 452 may be provided in the top plate 455. The biasing pin 456 may include a member such as a spring for biasing the upper retaining section 452 toward the lower retaining section 451.

The side retaining section 453 may push on the prism 33 from the side. Part of the lower retaining section 451 may protrude in at least two locations on the opposite side as the side that is pushed on by the side retaining section 453. The prism 33 can be supported from the side by the prism 33 being interposed between these protrusions and the side retaining section 453.

The heat removal plate 51 of the heat removal mechanism 50 may be anchored to a side surface of the frame 43 and a side surface of the base plate 40 using the bolts 52 and 53, respectively. Through this, heat from the prism 33 can be removed to the base plate 40 via the holder 45, the frame 43, and the heat removal mechanism 50.

3.2 Effects

As described above, thermally connecting the frame 43, which holds the prism 33 from which heat is to be removed, and the base plate 40 using the heat removal mechanism 50 makes it possible to ensure that heat from the prism 33 escapes to the base plate 40 in an efficient manner. Through this, the optical properties of the prism 33 can be stabilized. As a result, the laser light L1 outputted from the master oscillator system 10 can be stabilized.

3.3 Variations

The optical unit to be provided in the heat removal mechanism 50 is not limited to a unit in which a prism is mounted. For example, in the optical element within the narrow-band laser device (the master oscillator system 10), the heat removal mechanism 50 may be provided in the grating 31, the output coupling mirror 11, or the like. In addition, the attitude adjustment mechanism 60 may be provided in these mechanisms in the same manner.

3.3.1 Grating Unit

Figure 12:
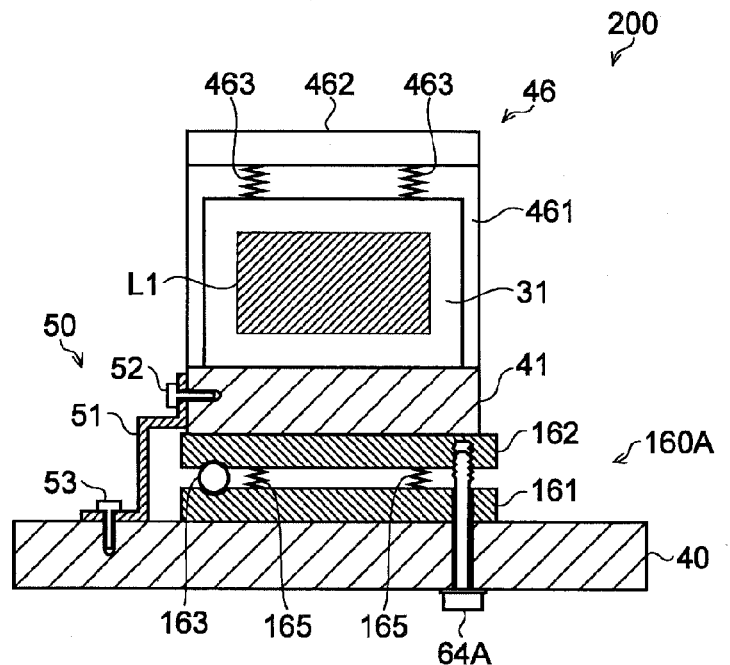
FIG. 12 schematically illustrates the configuration of a grating unit according to a variation on an embodiment.
Figure 13:
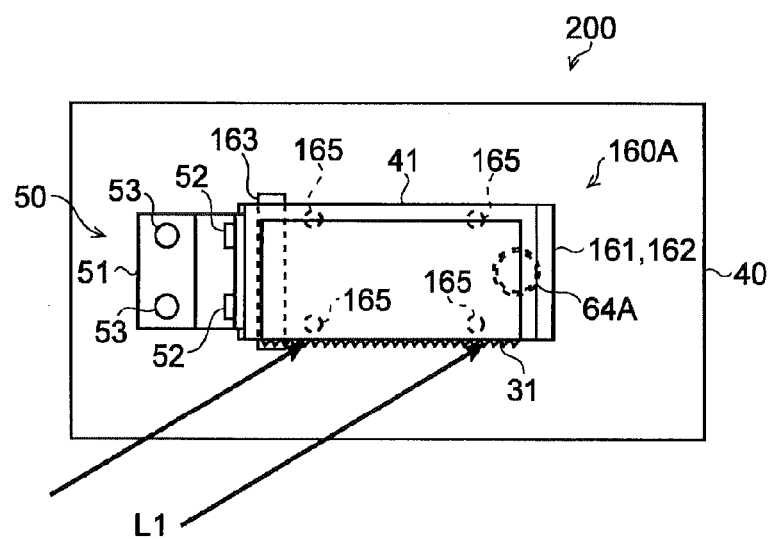
FIG. 13 schematically illustrates the cross-sectional structure of the grating unit illustrated in FIG. 12.

FIGS. 12 and 13 illustrate an example in which the heat removal mechanism 50 and an attitude adjustment mechanism 160A are provided in a grating unit 200 in which the grating 31 is mounted. FIG. 12 is a side view schematically illustrating the configuration of the grating unit 200 according to the present variation. FIG. 13 is a top view schematically illustrating the structure of the grating unit 200 illustrated in FIG. 12, with the exception of a top plate 462 and springs 463.

As shown in FIGS. 12 and 13, the grating unit 200 may include the attitude adjustment mechanism 160A, the frame 41, a holder 46, the grating 31, and the heat removal mechanism 50.

The attitude adjustment mechanism 160A may have the same configuration as the attitude adjustment mechanism 160, but may use the adjustment screw 64A instead of the adjustment screw 64, in the same manner as the attitude adjustment mechanism 60A. Other configurations may be the same as those in the aforementioned attitude adjustment mechanisms 160, 60, or 60A, and thus detailed descriptions thereof will be omitted here.

The grating 31 may be anchored upon the frame 41 using the holder 46. The holder 46 may include a standing plate 461, the top plate 462, and the springs 463. The standing plate 461 may extend essentially vertically from the frame 41. The rear surface of the grating 31 may make contact with the standing plate 461. The top plate 462 may be provided on the upper section of the standing plate 461. One or more of the springs 463 may be provided between the top plate 462 and the grating 31. The springs 463 may serve to anchor the grating 31 to the frame 41 by pushing the grating 31 against the frame 41. The holder 46 configured in this manner may be integral with the frame 41, or may be a separate member. In the case where the holder 46 is a separate member, the holder 46 may be anchored to the frame 41 using a bolt or the like (not shown), or may be welded to the frame 41.

The heat removal plate 51 of the heat removal mechanism 50 may be anchored to the frame 41 and the base plate 40 using the bolts 52 and 53, respectively. Through this, heat from the grating 31 can be removed to the base plate 40 via the frame 41 and the heat removal mechanism 50.

3.3.2 Mirror Unit

Figure 14:
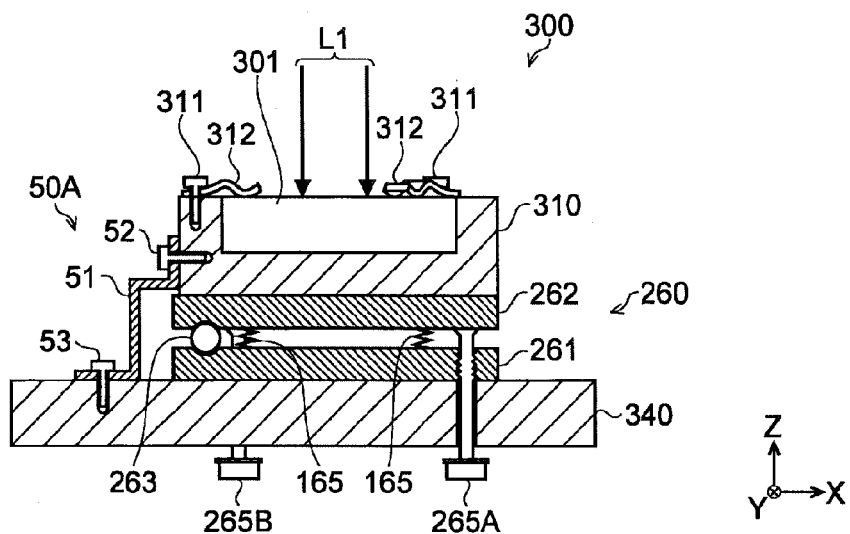
FIG. 14 schematically illustrates the configuration of a mirror unit according to another variation on an embodiment.
Figure 15:
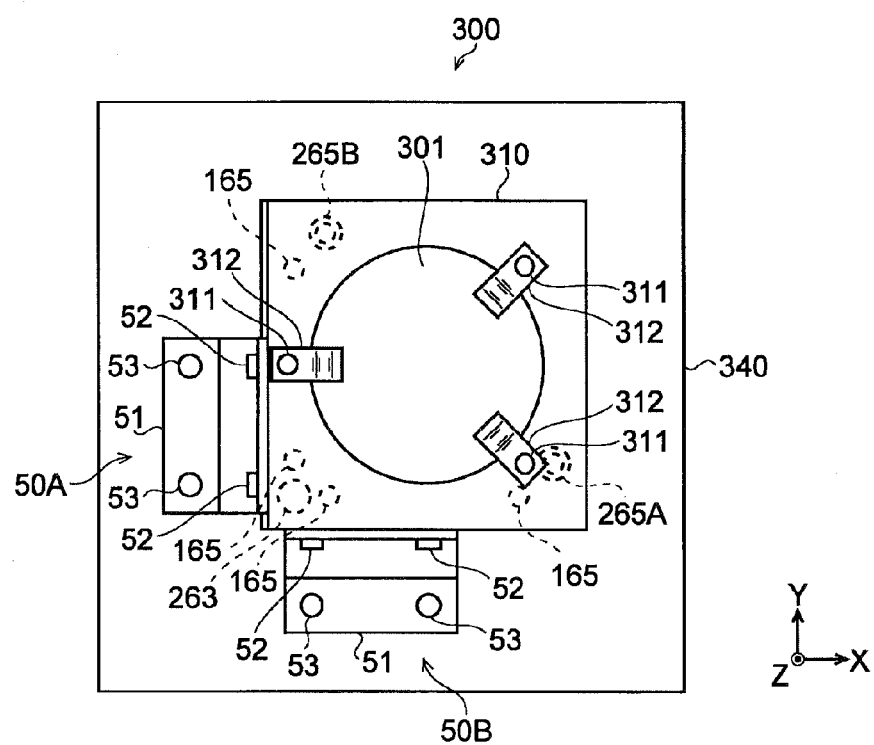
FIG. 15 schematically illustrates the cross-sectional structure of the mirror unit illustrated in FIG. 14.

Next, an example in which heat removal mechanisms 50A and 50B and an attitude adjustment mechanism 260 are provided in a mirror unit 300, in which a high-reflecting mirror 301 is mounted and that is an external to the narrow-band laser device (the master oscillator system 10), will be described. The high-reflecting mirror 301 can be disposed in a variety of locations. Here, general descriptions will be given without specifying the installation location. FIG. 14 is a cross-sectional view schematically illustrating the configuration of the mirror unit 300 according to the present variation. FIG. 15 is a top view schematically illustrating the cross-sectional structure of the mirror unit 300 illustrated in FIG. 14.

As shown in FIGS. 14 and 15, the mirror unit 300 may include the attitude adjustment mechanism 260, the two heat removal mechanisms 50A and 50B, a mirror holder 310, and the high-reflecting mirror 301. The heat removal mechanisms 50A and 50B may be the same as any of the aforementioned heat removal mechanisms 50, 150, and 250. In addition, although the mirror holder 310 is disposed directly on top of the attitude adjustment mechanism 260, the configuration is not limited thereto, and the mirror holder 310 may instead be mounted upon a frame that is installed upon the attitude adjustment mechanism 260. Meanwhile, the high-reflecting mirror 301 may be embedded in a recess provided in the mirror holder 310. Plate-shaped biasing springs 312 and anchor screws 311 for anchoring the biasing springs 312 to the mirror holder 310 may be provided in the mirror holder 310 as a stopper for preventing the high-reflecting mirror 301 from coming loose. Each of the biasing springs 312 may make contact with the reflecting surface side of the high-reflecting mirror 301 on one end and with part of the mirror holder on the other end. The anchor screws 311 may anchor the locations where the mirror holder 310 and the biasing springs 312 come into contact. It is preferable for such stoppers to be provided in at least two locations of the mirror holder 310.

The attitude adjustment mechanism 260 may be an attitude adjustment mechanism that includes, for example, a three-point support structure. As a specific example, the attitude adjustment mechanism 260 may include a lower plate 261, an upper plate 262, a ball (support section) 263, a plurality of springs 165, and two adjustment screws 265A and 265B. The plurality of springs 165 may be the same as the springs 165 described above.

The lower plate 261 and the upper plate 262 may, for example, have plate shapes so that a surface that is parallel to the installation surface of a base plate 340 has an approximately square shape. The upper plate 262 may be disposed higher than the lower plate 261, and may be separated from the lower plate 261 by a predetermined distance while remaining approximately parallel to the lower plate 261. Other configurations, the materials, and so on may be the same as the aforementioned lower plate 161 an upper plate 162.

The ball 263 may serve as one of the three points that support the upper plate 262 relative to the lower plate 261. The ball 263 may be, for example, a spherical member. In this case, it is preferable to provide recesses having a partially round shape that can accept the ball 263 in the lower plate 261 and the upper plate 262, respectively.

The adjustment screws 265A and 265B may serve as the other two of the three points that support the upper plate 262 relative to the lower plate 261. The adjustment screws 265A and 265B may, for example, pass through holes provided in the base plate 340 from the lower surface side thereof, and may project toward the upper plate 262 while being screwed into screw holes provided in the lower plate 261. The leading ends of the adjustment screws 265A and 265B that protrude from the lower plate 261 may make contact with the upper plate 262. Here, the leading ends of the adjustment screws 265A and 265B may be flared. The upper plate 262 may be supported from below at three points by the ball 263 and the two adjustment screws 265A and 265B.

It is preferable for the two adjustment screws 265A and 265B and the ball 263 to be disposed so that, regardless of which plane of a cross-section that passes through the center of the upper plate 262 and that is perpendicular to the mounting surface of the base plate 340 is viewed from, the adjustment screws 265A and 265B and the ball 263 are not contained on one side of the space defined by that plane. For example, in the case where the ball 263 is disposed in the vicinity of one of the four corners of the lower plate 261, the two adjustment screws 265A and 265B may be disposed near the respective other ends of the two sides that are adjacent to the corner at which the ball 263 is disposed. Meanwhile, the springs 165 may be respectively provided near the ball 263 and the adjustment screws 265A and 265B.

According to this configuration, adjusting the amount by which the one adjustment screw 265A is screwed into the screw hole in the lower plate 261 makes it possible to open/close the upper plate 262 relative to the lower plate 261 with a line connecting a support point realized by the ball 263 to a support point realized by the other adjustment screw 265B (approximately the Y axis in the drawings) serving essentially as an axis. Likewise, adjusting the amount by which the other adjustment screw 265B is screwed into the screw hole in the lower plate 261 makes it possible to open/close the upper plate 262 relative to the lower plate 261 with a line connecting the support point realized by the ball 263 to a support point realized by the one adjustment screw 265A (approximately the X axis in the drawings) serving essentially as an axis. As a result, the attitude of the high-reflecting mirror 301 held in the mirror holder 310 on the upper plate 262 can be adjusted relative to the optical path of the laser light L1 along two axial directions.

Meanwhile, it is preferable for the heat removal mechanism 50A to be provided on the side surface of the mirror holder 310 that passes between the corner in the vicinity of which the ball 263 is disposed and the corner in the vicinity of which the other adjustment screw 265B is disposed. At this time, it is preferable for the heat removal mechanism 50A to be attached to the mirror holder 310 and the base plate 340 so that the principal plane of the heat removal plate 51 is essentially parallel to a line that connects the support point realized by the ball 263 to the support point realized by the other adjustment screw 265B. Furthermore, it is preferable for the direction in which the bent area of the heat removal plate 51 extends to be essentially parallel to the direction in which the line connecting the support point realized by the ball 263 with the support point realized by the other adjustment screw 265B extends.

Likewise, it is preferable for the heat removal mechanism 50B to be provided on the side surface of the mirror holder 310 that passes between the corner in the vicinity of which the ball 263 is disposed and the corner in the vicinity of which the one adjustment screw 265A is disposed. At this time, it is preferable for the heat removal mechanism 50B to be attached to the mirror holder 310 and the base plate 340 so that the principal plane of the heat removal plate 51 is essentially parallel to a line that connects the support point realized by the ball 263 to the support point realized by the one adjustment screw 265A. Furthermore, it is preferable for the direction in which the bent area of the heat removal plate 51 extends to be essentially parallel to the direction in which the line connecting the support point realized by the ball 263 with the support point realized by the one adjustment screw 265A extends.

According to this configuration, the heat removal plate 51 of the heat removal mechanisms 50A and 50B can deform with ease in response to the opening/closing of the upper plate 262. As a result, it is possible to reduce a resistive force that interferes with the control of the attitude of the high-reflecting mirror 301. This may be the same in the case where another heat removal mechanism (for example, the heat removal mechanism 150 or 250) is used as well. Note that it is preferable for the heat removal mechanisms 50A and 50B to be provided in a location near the corner at which the ball 263 is disposed. In such a case, the respective amounts of deformation occurring when the upper plate 262 opens/closes are low, and thus it is possible to reduce a resistive force that interferes with the control of the attitude of the high-reflecting mirror 301.

4. Variable Spectral Bandwidth Laser Device for Exposure Device

Next, a laser device including the aforementioned narrowband laser device (master oscillator system 10) will be described in detail with reference to the drawings.

4.1 Configuration

Figure 16:
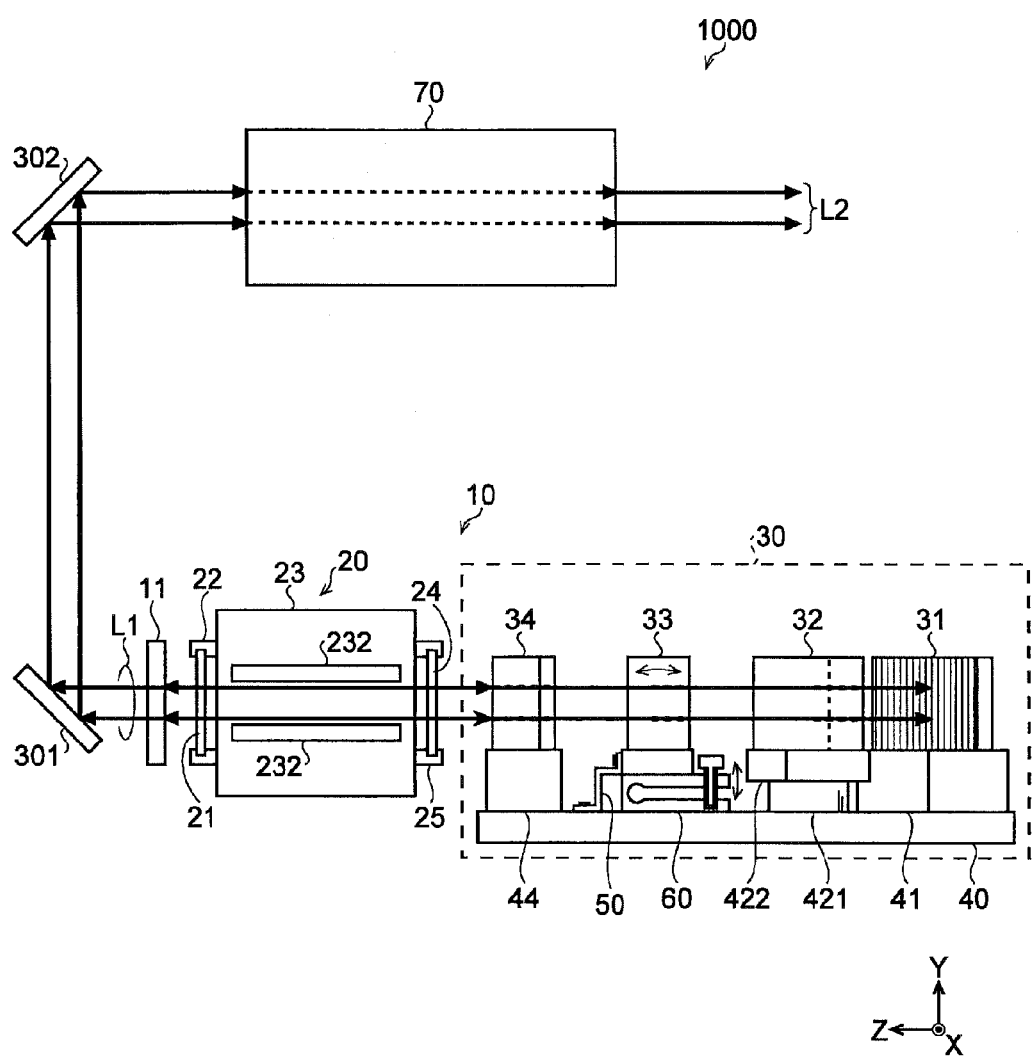
FIG. 16 schematically illustrates an example of the configuration of a laser device that includes the master oscillator system according to an embodiment.

FIG. 16 schematically illustrates an example of the configuration of a laser device 1000 that includes the master oscillator system 10 according to the aforementioned embodiment. The laser device 1000 may be a laser used for semiconductor exposure. The laser device 1000 may be a two-stage laser device including an oscillation stage (master oscillator) and an amplification stage (amplifying apparatus).

As shown in FIG. 16, the laser device 1000 may include the master oscillator system 10 and an amplifying apparatus 70. The laser device 1000 may further include an optical system such as high-reflecting mirrors 301 and 302.

The laser light L1 outputted from the master oscillator system 10 may be pulsed light. The optical system such as the high-reflecting mirrors 301 and 302 may be disposed within the optical path between the master oscillator system 10 and the amplifying apparatus 70. The high-reflecting mirrors 301 and 302 may be incorporated into the laser device 1000 in the form of the mirror unit 300 described using FIGS. 14 and 15. Although FIGS. 14 and 15 only illustrate the high-reflecting mirror 301, the mirror illustrated therein may be the high-reflecting mirror 302.

The amplifying apparatus 70 may amplify the laser light L1 that enters into the optical system configured of the high-reflecting mirrors 301 and 302 and so on. The amplifying apparatus 70 may contain a gain medium such as an excimer laser gas in its interior. The amplifying apparatus 70 may operate under the control of a controller (not shown).

4.2 Operations

Next, the general operations of the laser device 1000 illustrated in FIG. 16 will be described. The controller of the laser device 1000 may receive, from an external device such as a controller in an exposure device, an exposure command requesting the laser light L1 for exposure to be outputted. Upon receiving the exposure command, the controller may cause the master oscillator system 10 to carry out laser oscillation. Through this, the laser light L1 may be outputted from the master oscillator system 10.

Meanwhile, the controller may apply a pumping charge to the amplifying apparatus 70 at a timing when the laser light L1 outputted from the master oscillator system 10 is present within the amplifying apparatus 70. Through this, amplified laser light L2 may be outputted from the amplifying apparatus 70. This laser light L2 may be guided to the exposure device via an optical system (not shown).

5. Other

5.1 Amplifying Apparatus

Here, the amplifying apparatus 70 illustrated in FIG. 16 will be described in detail using the drawings. The amplifying apparatus 70 may be an amplifying apparatus of a variety of types, such as a power oscillator, a power amplifier, a regenerative amplifier, or the like. Furthermore, the amplifying apparatus 70 may be a single amplifying apparatus, or may include a plurality of amplifying apparatuses.

5.1.1 Embodiment Including Fabry-Perot Resonator

Figure 17:
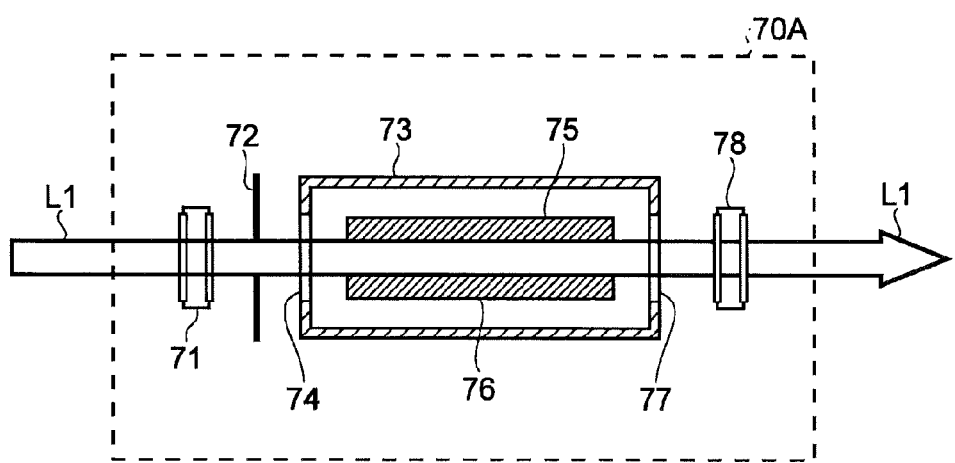
FIG. 17 schematically illustrates the overall configuration of an amplifying apparatus that employs a power oscillator including a Fabry-Perot resonator according to an embodiment.

First, a case where a power oscillator including a Fabry-Perot resonator is used as the amplifying apparatus 70 will be described as an example. FIG. 17 schematically illustrates the overall configuration of an amplifying apparatus 70A that employs a power oscillator including a Fabry-Perot resonator. As shown in FIG. 17, the amplifying apparatus 70A may include a chamber 73. The amplifying apparatus 70A may include a rear mirror 71 that reflects some laser light while allowing some of the laser light to pass, and an output coupling mirror 78 that reflects some laser light while allowing some of the laser light to pass. The rear mirror 71 and the output coupling mirror 78 may form an optical resonator. Here, it is preferable for the reflectance of the rear mirror 71 to be higher than the reflectance of the output coupling mirror 78. The output coupling mirror 78 may serve as an output end for the amplified laser light L1.

The amplifying apparatus 70A may further include a slit 72 that adjusts the beam profile of the laser light L1. Windows 74 and 77 may be provided in the chamber 73. The windows 74 and 77 may allow the laser light L1 to pass through while maintaining the chamber 73 in a sealed state. A gain medium such as an excimer laser gas may be injected into the chamber 73. The gain medium may contain, for example, one of krypton (Kr) gas and argon (Ar) gas, as well as fluorine ($F_2$) gas and neon (Ne) gas, and may further include xenon (Xe) gas as necessary. Furthermore, a pair of discharge electrodes 75 and 76 may be provided within the chamber 73. The discharge electrodes 75 and 76 may be disposed on either side of a region through which the laser light L1 passes (an amplification region). A pulsed high voltage may be applied between the discharge electrodes 75 and 76, from a power source (not shown). The high voltage may be applied between the discharge electrodes 75 and 76 in correspondence with the timing at which the laser light L1 passes through the amplification region. When the high voltage is applied between the discharge electrodes 75 and 76, an amplification region containing an activated gain medium can be formed between the discharge electrodes 75 and 76. The laser light L1 can be amplified when passing through this amplification region.

5.1.2 Embodiment Including Ring Resonator

Figure 18:
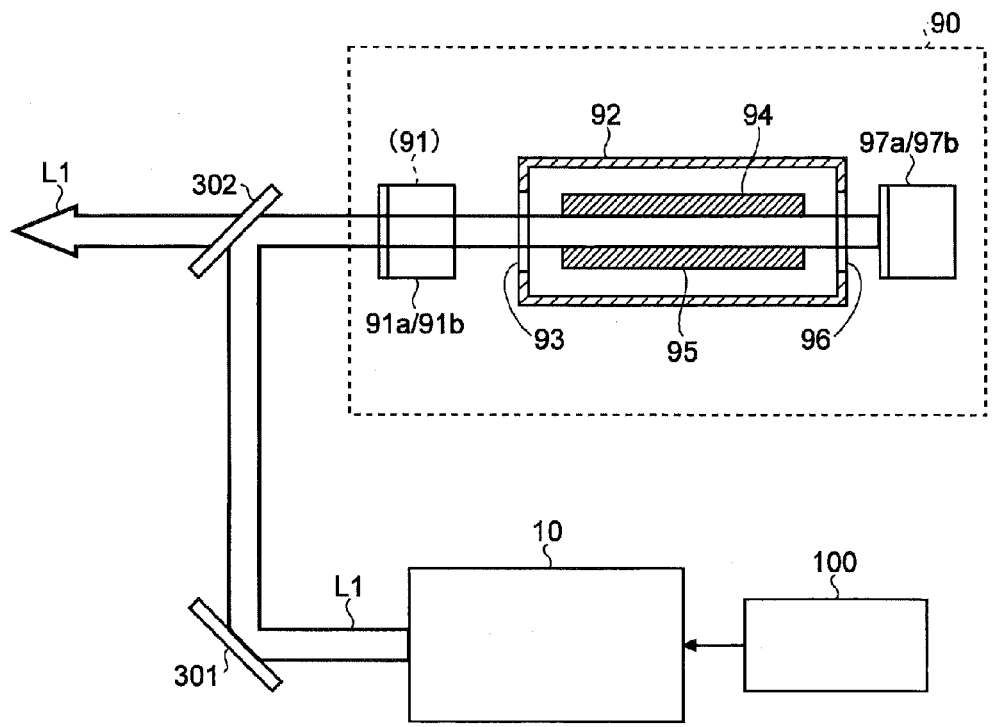
FIG. 18 schematically illustrates the overall configuration of an amplifying apparatus that employs a power oscillator including a ring resonator according to an embodiment.
Figure 19:
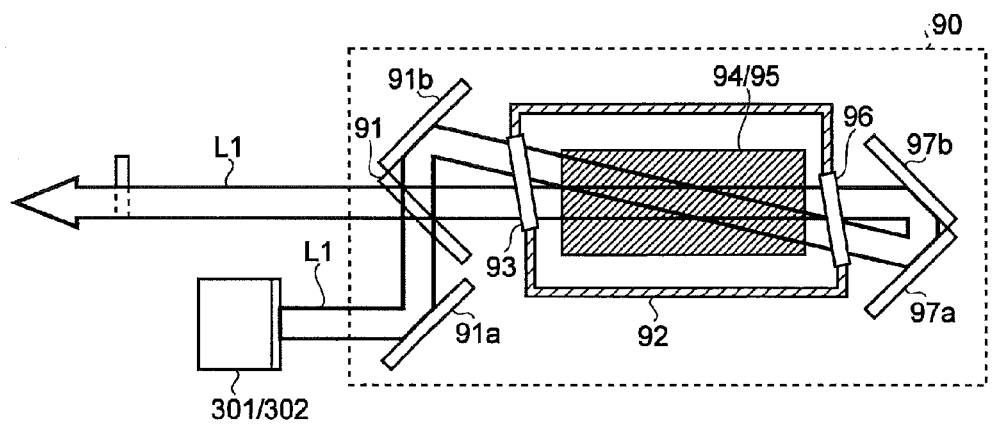
FIG. 19 is a top view of the amplifying apparatus illustrated in FIG. 18.

Next, a case where a power oscillator including a ring resonator is used as the amplifying apparatus 70 will be described as an example. FIGS. 18 and 19 schematically illustrate the overall configuration of an amplifying apparatus 90 that employs a power oscillator including a ring resonator. FIG. 18 is a side view of the amplifying apparatus 90, whereas FIG. 19 is a top view of the amplifying apparatus 90.

As shown in FIGS. 18 and 19, the amplifying apparatus 90 may include high-reflecting mirrors 91a, 91b, 97a, and 97b, an output coupler 91 that is a partially-transmissive mirror, and a chamber 92. The high-reflecting mirrors 91a, 91b, 97a, and 97b and the output coupler 91 may form a multipass through which the laser light L1 passes through the amplification region within the chamber 92 a plurality of times. A folding reflective prism may be used instead of the high-reflecting mirrors 97a and 97b. The output coupler 91 may be a partially-reflecting mirror. The chamber 92 may be disposed in the optical path formed by the high-reflecting mirrors 91a, 91b, 97a, and 97b and the output coupler 91. Note that the amplifying apparatus 90 may further include a slit (not shown) that adjusts the beam profile of the laser light L1 that travels within the amplifying apparatus 90. A gain medium such as an excimer laser gas may be injected into the chamber 92 so as to fill the amplification region. The gain medium may contain, for example, one of Kr gas and Ar gas, as well as $F_2$ gas and Ne gas, and may further include Xe gas as necessary.

In the stated configuration, the laser light L1 outputted from, for example, the master oscillator system 10 may enter into the amplifying apparatus 90 via a high-reflecting mirror 301 and a high-reflecting mirror 302. The laser light L1 that has entered may first enter into the chamber 92 via a window 93 after being reflected by the high-reflecting mirrors 91a and 91b. The laser light L1 that has entered into the chamber 92 may be amplified when passing through an amplification region between two discharge electrodes 94 and 95 between which a voltage has been applied. The amplified laser light L1 may be emitted from the chamber 92 through a window 96. The emitted laser light L1 may then once again enter into the chamber 92 via the window 96 after being reflected by the high-reflecting mirrors 97a and 97b. After this, the laser light L1 may once again be amplified when passing through the amplification region within the chamber 92. The amplified laser light L1 may be emitted from the chamber 92 through the window 93.

The laser light L1 that has passed through the amplification region within the chamber 92 twice in this manner may then be partially outputted via the output coupler 91. Meanwhile, the remaining laser light that has been reflected by the output coupler 91 may be amplified by once again traveling through an optical path formed by the high-reflecting mirrors 91b, 97a, and 97b and the output coupler 91.

The aforementioned descriptions are intended to be taken only as examples, and are not to be considered as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the indefinite article "a" or "an" as used in the present specification and the scope of the appended claims should be interpreted as meaning "at least one" or "one or more".

What is claimed is:

1. An excimer laser comprising:
a frame;
a base plate on which said frame is disposed;
an excimer laser configured to oscillate and output laser light by discharge-pumping within a chamber containing a laser gas;
an optical element that is mounted upon said frame and that is disposed in the optical path of said outputted laser light;
a heat removal mechanism connected to both said frame and said base plate; and
a heat transfer mechanism having an interspace connected to both said frame and said base plate;
wherein said heat transfer mechanism is an attitude adjustment mechanism mounted upon said base plate,
said frame is mounted upon a mounting surface of said attitude adjustment mechanism,
said attitude adjustment mechanism includes a lower plate section disposed upon said base plate, an upper plate section positioned above the lower plate section, a support section that supports the upper plate section relative to said lower plate section, a first adjustment section that supports said upper plate section relative to said lower plate section at a different location than the support section and that is configured to enable the distance between said lower plate section and said upper plate section to be adjusted, said interspace is defined as surrounded by the lower plate, the upper plate and the support section,
said attitude adjustment mechanism is configured to adjust the tilt of said mounting surface relative to said base plate, and
a first direction in which a bent area of said heat removal mechanism extends to be essentially parallel to a second direction in which said support section extends.

2. The excimer laser according to claim 1, wherein said heat removal mechanism includes a heat transfer section, and two attachment sections that are attached to said frame and said base plate respectively; and said heat transfer section has a shape that can deform in response to displacement between said two attachment sections.

3. The excimer laser according to claim 2, wherein said heat transfer section has a bent shape.

4. The excimer laser according to claim 2, wherein said heat transfer section includes a mesh.

5. The excimer laser according to claim 2, wherein the thermal conductivity of said heat transfer section is higher than the thermal conductivity of said frame.

6. The excimer laser according to claim 1,
wherein said support section is a cylindrical member disposed so that the axis of said support section extends along the surfaces of said upper plate section and said lower plate section, respectively, that oppose each other;
a first groove for accepting said cylindrical member from below is provided in said lower plate section; and
a second groove for accepting said cylindrical member from above is provided in said upper plate section.

7. The excimer laser according to claim 1,
wherein said attitude adjustment mechanism further includes a second adjustment section that supports said upper plate section relative to said lower plate section at a different location than said support section and said first adjustment section, and that is configured to enable the distance between said lower plate section and said upper plate section to be adjusted.

8. The excimer laser according to claim 7,
wherein said support section is a spherical member;
a first recess for accepting said spherical member from below is provided in said lower plate section; and
a second recess for accepting said spherical member from above is provided in said upper plate section.

9. The excimer laser according to claim 1,
wherein said optical element includes at least one of a prism, a grating, and a mirror.

10. The excimer laser according to claim 1, wherein a grating that functions as one resonator mirror in an optical resonator is included as said optical element.

11. A laser device comprising:
the excimer laser according to claim 10; and
an amplifying apparatus that amplifies laser light outputted from said excimer laser.

12. The excimer laser according to claim 1, wherein said heat removal mechanism is connected to both said frame and said base plate with bolts.

* * * * *